United States Patent
Ellis et al.

(10) Patent No.: US 8,840,369 B2
(45) Date of Patent: Sep. 23, 2014

(54) APPARATUS AND METHODS FOR COOLING PLATFORM REGIONS OF TURBINE ROTOR BLADES

(75) Inventors: Scott Edmond Ellis, Easley, SC (US); John Wesley Harris, Jr., Taylors, SC (US); Adrian Lional Scott, Greer, SC (US)

(73) Assignee: General Electric Company, Schenectady, NY (US)

( * ) Notice: Subject to any disclaimer, the term of this patent is extended or adjusted under 35 U.S.C. 154(b) by 1028 days.

(21) Appl. No.: 12/894,934

(22) Filed: Sep. 30, 2010

(65) Prior Publication Data

US 2012/0082548 A1    Apr. 5, 2012

(51) Int. Cl.
  *F01D 5/18*    (2006.01)
  *F01D 5/08*    (2006.01)

(52) U.S. Cl.
  CPC ............ *F01D 5/187* (2013.01); *F05D 2240/81* (2013.01); *F01D 5/087* (2013.01); *F05D 2230/60* (2013.01); *F05D 2230/80* (2013.01); *F05D 2250/185* (2013.01); *Y02T 50/676* (2013.01)
  USPC ..................... 416/96 R; 416/97 R; 416/193 A (58) Field of Classification Search
  USPC ....... 415/115, 116; 416/95, 96 R, 96 A, 97 R, 416/193 A
  See application file for complete search history.

(56) References Cited

U.S. PATENT DOCUMENTS

| | | |
|---|---|---|
| 3,628,880 A * | 12/1971 | Smuland et al. ............ 415/115 |
| 3,807,892 A * | 4/1974 | Frei et al. .................... 415/116 |
| 3,950,114 A | 4/1976 | Helms |
| 4,712,979 A | 12/1987 | Finger |
| 4,798,514 A | 1/1989 | Pask |
| 5,340,278 A | 8/1994 | Magowan |
| 5,382,135 A | 1/1995 | Green |
| 5,813,835 A | 9/1998 | Corsmeier et al. |
| 5,915,923 A * | 6/1999 | Tomita et al. ............... 416/96 R |
| 6,017,819 A | 1/2000 | Brigham et al. |
| 6,019,579 A | 2/2000 | Fukuno et al. |
| 6,120,249 A | 9/2000 | Hultgren et al. |
| 6,190,130 B1 | 2/2001 | Fukue et al. |
| 6,196,799 B1 | 3/2001 | Fukue et al. |
| 6,402,417 B1 | 6/2002 | Okamoto |
| 6,431,833 B2 | 8/2002 | Jones |
| 6,478,540 B2 | 11/2002 | Abuaf et al. |
| 7,097,424 B2 | 8/2006 | Cunha et al. |

(Continued)

FOREIGN PATENT DOCUMENTS

JP        2005-146858 A  *  6/2005  ............... F01D 5/18

*Primary Examiner* — Christopher Verdier
(74) *Attorney, Agent, or Firm* — Mark E. Henderson; Ernest G. Cusick; Frank A. Landgraff (57) ABSTRACT

A platform cooling arrangement in a turbine rotor blade having a platform, wherein the rotor blade includes an interior cooling passage, and wherein, in operation, the interior cooling passage comprises a high-pressure coolant region and a low-pressure coolant region, and wherein the platform includes a platform underside. The platform cooling arrangement may include: a first plate that resides inboard and in spaced relation to the platform underside and forming a first plenum; a second plate that resides inboard and in spaced relation to the first plate, the second plate forming a second plenum. The second plenum includes an inlet channel that connects to the high-pressure coolant region of the interior cooling passage, and the first plenum includes an outlet channel that connects to the low-pressure coolant region of the interior cooling passage.

15 Claims, 9 Drawing Sheets

(56) References Cited

U.S. PATENT DOCUMENTS

| | | |
|---|---|---|
| 7,147,439 B2 | 12/2006 | Jacala et al. |
| 7,198,467 B2 | 4/2007 | Keith et al. |
| 7,347,664 B2 | 3/2008 | Kayser et al. |
| 7,416,391 B2 | 8/2008 | Veltre et al. |
| 2006/0056968 A1 | 3/2006 | Jacala et al. |
| 2006/0269409 A1* | 11/2006 | Torii et al. ............. 416/97 R |
| 2007/0189896 A1 | 8/2007 | Itzel et al. |
| 2008/0190114 A1* | 8/2008 | Surace et al. ........... 416/97 R |
| 2009/0028692 A1* | 1/2009 | Surace et al. ............. 415/115 |

\* cited by examiner

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Figure 1:
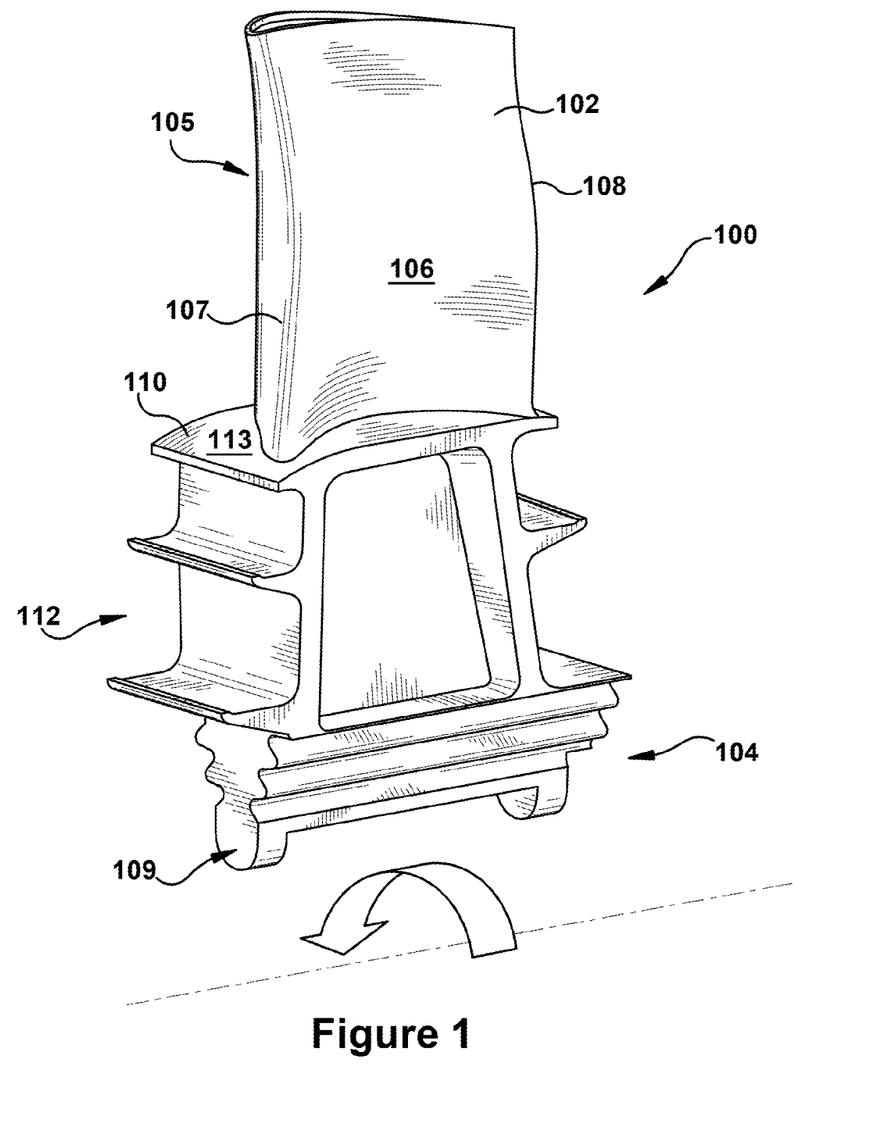
FIG. 1 illustrates a perspective view of an exemplary turbine rotor blade in which embodiments of the present invention may be employed.
Figure 2:
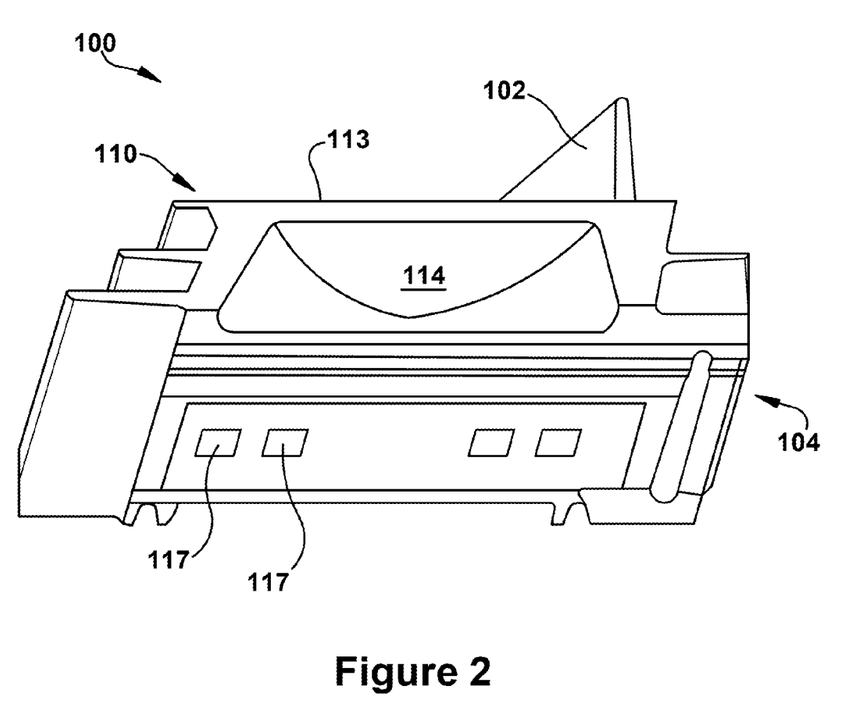
FIG. 2 illustrates an underside view of a turbine rotor blade in which embodiments of the present invention may be used.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4, and 5) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

Figure 3:
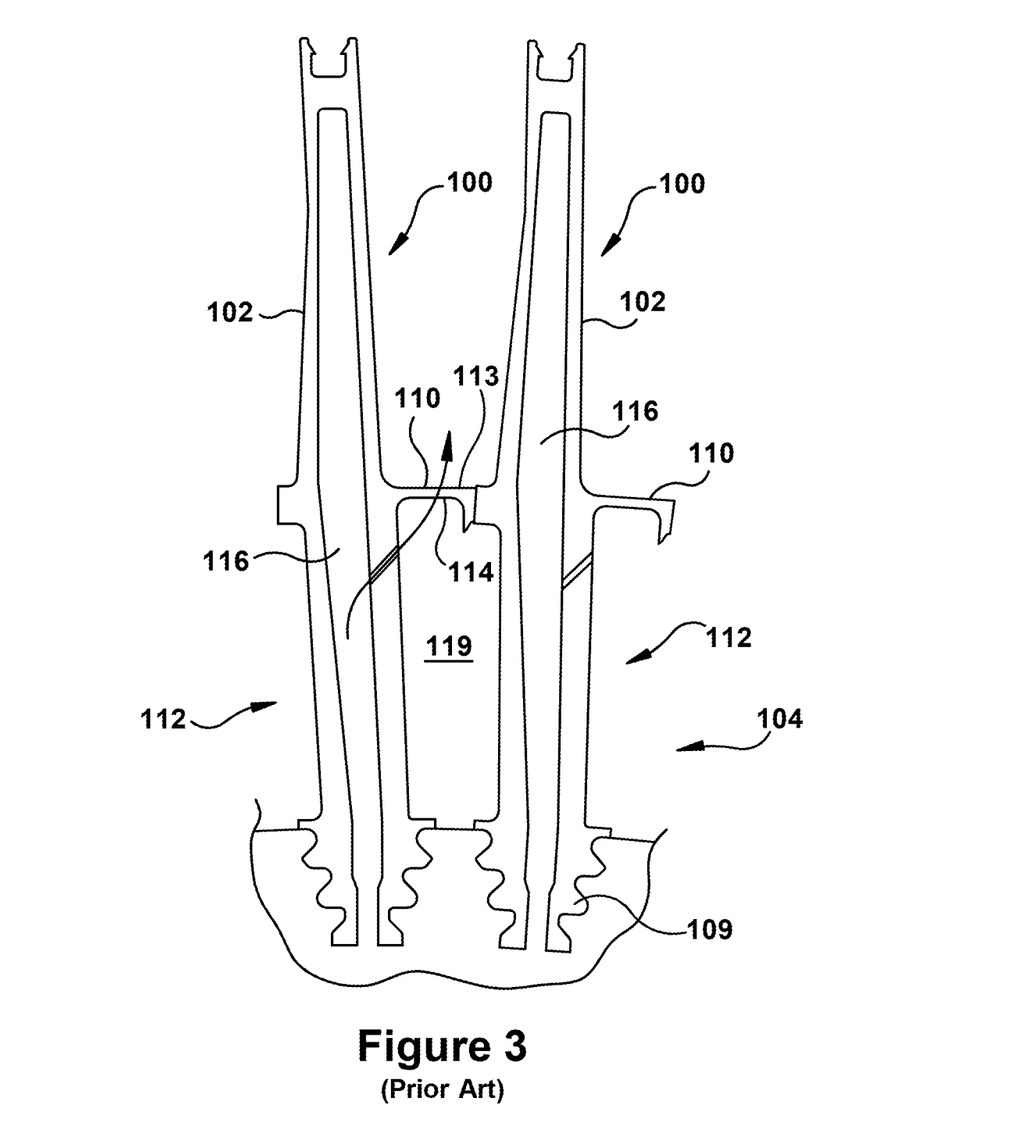
FIG. 3 illustrates a sectional view of neighboring turbine rotor blades having a cooling system according to conventional design.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

Figure 4:
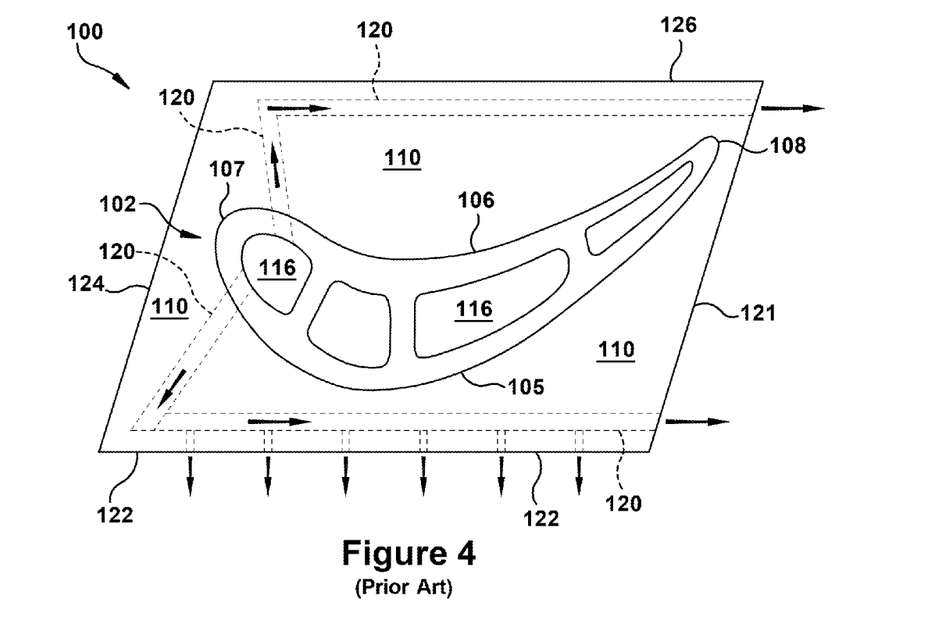
FIG. 4 illustrates a top view of a turbine rotor blade having a platform with interior cooling passages according to conventional design.
Figure 5:
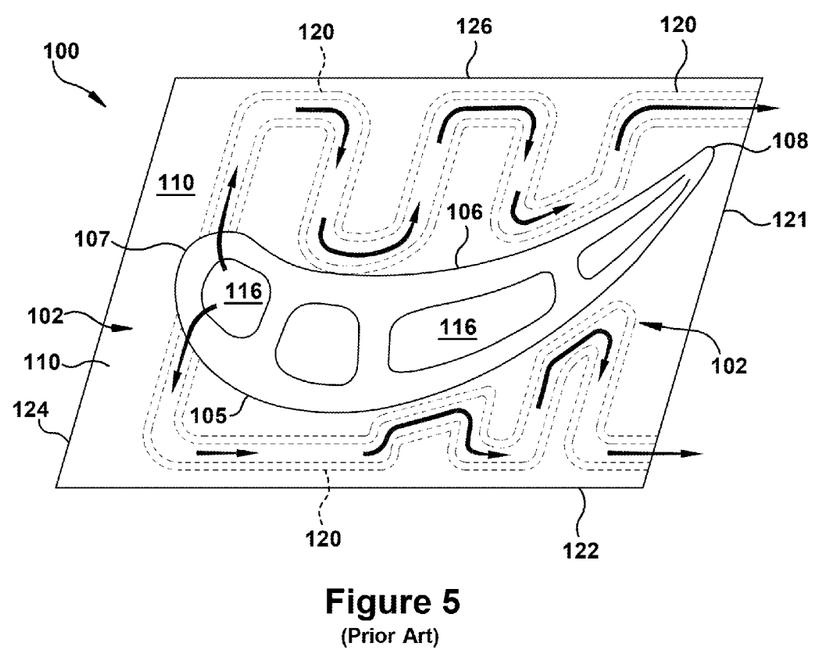
FIG. 5 illustrates a top view of a turbine rotor blade having a platform with interior cooling passages according to an alternative conventional design.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels have shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein the platform includes a platform underside along an inboard surface. The platform cooling arrangement may include: a first plate that resides inboard and in spaced relation to the platform underside, the first plate being configured such that a first plenum is formed between the first plate and the platform underside; and a second plate that resides inboard and in spaced relation to the first plate, the second plate being configured such that a second plenum is formed between the second plate and the first plate. The second plenum may include at least one inlet channel that connects to the high-pressure coolant region of the interior cooling passage. The first plenum may include at least one outlet channel that connects to the low-pressure coolant region of the interior cooling passage. The first plate may include a plurality of impingement apertures.

The present application further describes a method of creating a platform cooling arrangement for a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein the platform includes a platform underside along an inboard surface. The method may include the steps of: attaching a first plate to the rotor blade so that the first plate resides inboard, approximately parallel, and in spaced relation to the platform underside, thereby forming a first plenum between the first plate and the platform underside; and attaching a second plate to the first plate so that the second plate resides inboard, approximately parallel, and in spaced relation to the first plate, thereby forming a second plenum between the second plate and the first plate. The first plate may include a plurality of impingement apertures, the impingement apertures comprising narrow apertures that extend through the thickness of first plate such that, when a supply of pressurized coolant is introduced into the second plenum, the impingement apertures impinge the pressurized coolant and, thereby, create coolant jets that are directed against the underside of the platform.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 6:
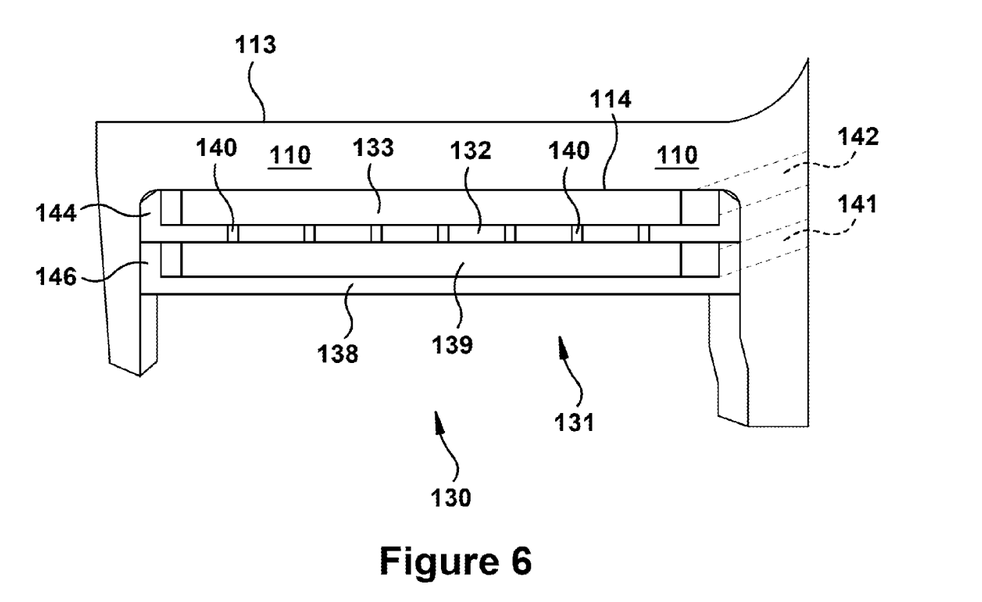
FIG. 6 is a cross-sectional side view of a platform cooling arrangement according to an embodiment of the present application.
Figure 8:
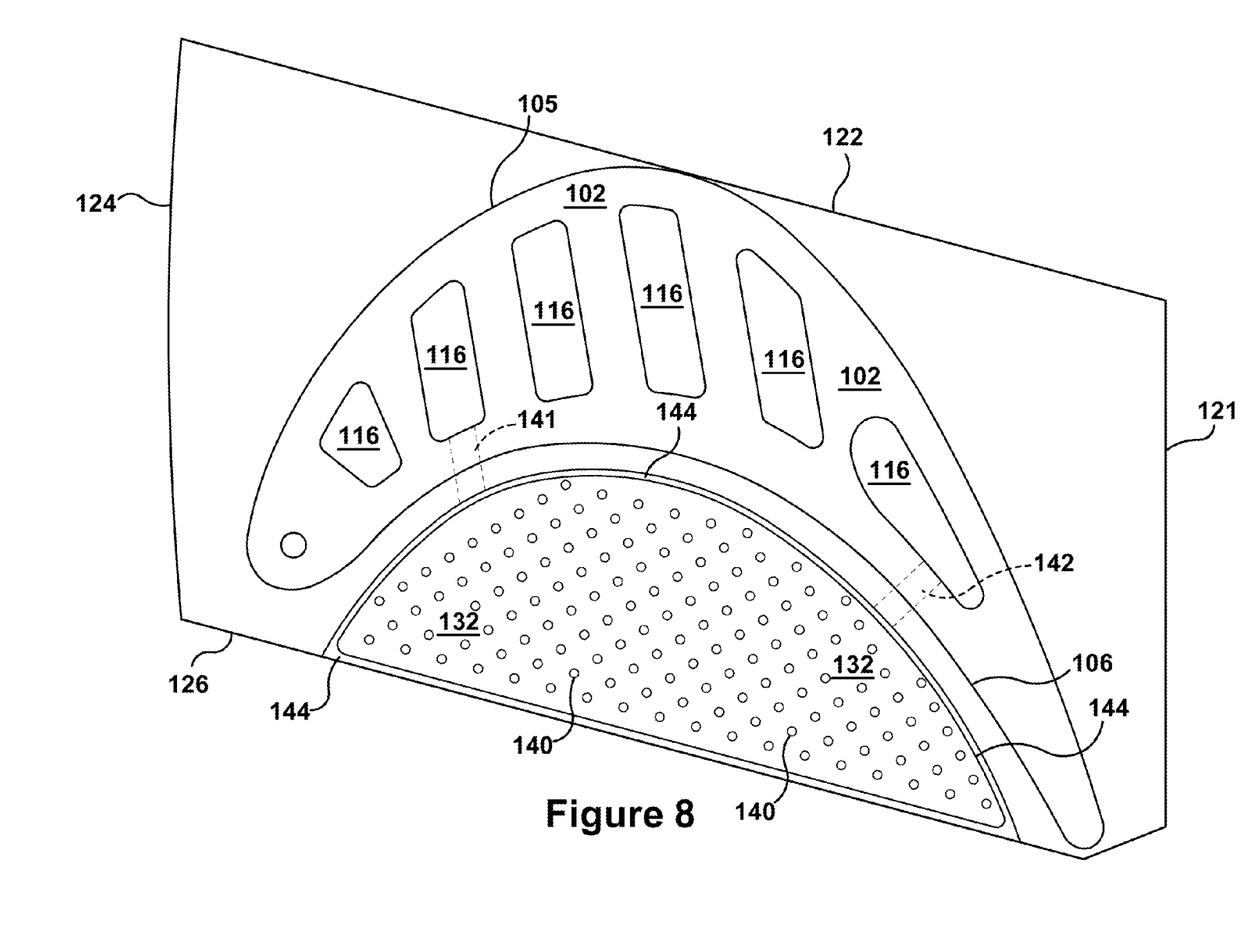
FIG. 8 is a cross-sectional top view of a platform cooling arrangement according to an embodiment of the present application.
Figure 9:
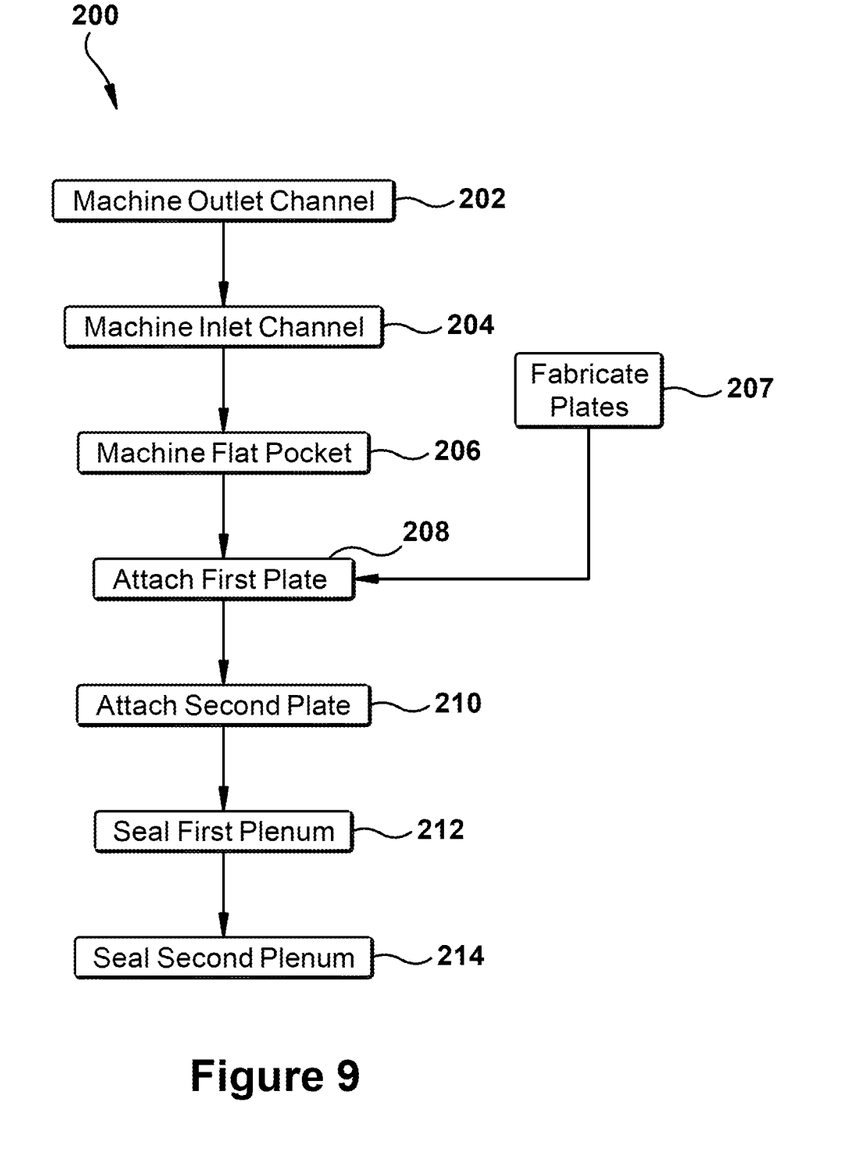
FIG. 9 is a flow diagram illustrating an exemplary method of creating the platform cooling arrangement according to an embodiment of the present application.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIGS. 6, 8, and 9, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 7:
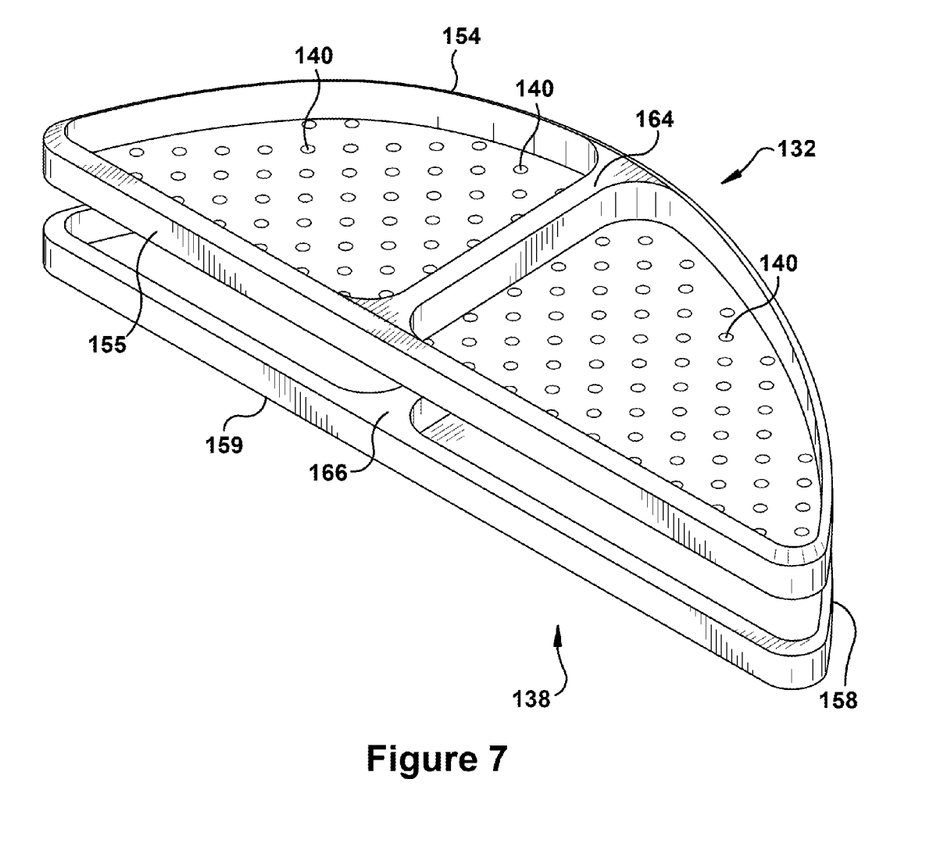
FIG. 7 is a perspective view of a first plate and a second plate according to an embodiment of the present application.

Referring again to the figures, FIGS. 6 through 9 provide several views of exemplary embodiments of the present invention. FIG. 6 shows a cross-sectional side view of a platform cooling arrangement 130 according to an embodiment of the present application, while FIG. 8 provides a cross-sectional top view of the same. FIG. 7 shows a perspective view of a first plate 132 (which may be referred to as an "outboard plate" or "impingement plate") and a second plate 138 (which may be referred to as an "inboard plate" or "closeout plate") according to an embodiment of the present application. As illustrated, a platform 110 may be located at an interface between the airfoil 102 and the root 104 of a rotor blade 100.

The platform 110 may include a platform underside 114 along an inboard surface of the platform 110. Like the topside 113 of the platform, the underside 114 may include an axially and circumferentially extending planar surface. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) In an embodiment of the present application, a flat pocket 131 may be located in the platform underside 114. The flat pocket 131 may be formed by one or more manufacturing methods, such as, but not limited to, machining, casting, and the like. For example, an existing rotor blade may be machined such that an appropriate flat pocket 131 is formed. In an embodiment of the present application, the flat pocket 131 may be located on a region of the platform underside 114 that substantially coincides with the pressure side of the airfoil 102 of the blade. In another embodiment of the present application, the flat pocket 131 may be configured to accept at least two stacked plates to form a platform cooling arrangement, as described herein.

FIG. 6 illustrates a sectional view of a platform cooling arrangement 130, according to an exemplary embodiment of the present application. The platform cooling arrangement 130 may include a first or impingement plate 132 that resides inboard and in spaced relation to the platform underside 114, thereby forming a first plenum 133 between the impingement plate 132 and the platform underside 114. A second or closeout plate 138 may reside inboard and in spaced relation to the impingement plate 132, thereby forming a second plenum 139 between the closeout plate 138 and the impingement plate 132. In an embodiment of the present application, the impingement plate 132 and/or the closeout plate 138 may be substantially planar. Further, the impingement plate 132 and the closeout plate 138 may be located on a region of the platform underside 114 that coincides substantially with a pressure side of the airfoil 102.

In an embodiment of the present application, the impingement plate 132 includes multiple impingement apertures 140 that may extend through the thickness of the impingement plate 132. The impingement apertures 140 may be configured such that, when a supply of pressurized coolant is introduced into the second plenum 139, the impingement apertures 140 impinge the pressurized coolant and, thereby, create coolant jets that strike and cool the platform underside 114. The impingement apertures 140 may have a cross-sectional flow area of a predetermined size such that, given other operational criteria, a desired coolant impingement characteristic, such as increasing the velocity at which a stream of coolant strikes a target surface, is achieved. In general, it will be appreciated that, if the impinged flow is directed against a target surface, the cooling effect of the resulting high velocity stream of coolant is improved. The impingement apertures 140 further may have a cross-sectional flow area of a predetermined size such that, given other operational criteria, a desired coolant metering characteristic is achieved. As used herein, a "desired metering characteristic" refers to a desired distribution of coolant (or expected distribution of coolant) through impingement apertures 140. The impingement apertures 140 may be configured to substantially focus a flow of coolant against the platform underside 114. It will be appreciated that such impingement cooling may enhance the cooling of the platform 110. In an embodiment of the present application, the impingement apertures 140 may be substantially of a cylindrical shape. However, other shapes of the impingement apertures 140, such as, but not limited to, cuboidal, prismatic, and the like, may also be possible. Other diameter sizes are possible also. Further, the impingement apertures 140 may be oriented substantially perpendicular to the surface of the impingement plate 132. The impingement apertures 140 may also be obliquely oriented with respect to the surface of the impingement plate 132 without departing from the scope of the present application.

In an embodiment of the present application, the second plenum 139 may include at least one inlet or inlet channel (which may be referred to as a high-pressure connector 141), which is in fluid communication with the high pressure-region of the interior cooling passage 116. The first plenum 133 may include at least one outlet or outlet channel (which may be referred to as a low-pressure connector 142) that is in fluid communication with the low-pressure coolant region of the interior cooling passage 116. In various embodiments of the present application, the high-pressure connector 141 and/or the low-pressure connector 142 may be manufactured by one or more methods, for example, but not limited to, machining, casting and the like. During operation, the coolant flowing through the high-pressure coolant region of the interior cooling passage 116 may enter the second plenum 139 via the high-pressure connector 141. Thereafter, the coolant may flow through the impingement apertures 140 and substantially perform the impingement cooling of the platform 110 by striking against the platform underside 114. Subsequently, the coolant may exit the first plenum 133 to the low-pressure coolant region of the interior cooling passage 116 via the low-pressure connector 142. As stated, due to the aforementioned functional relationship between various components of the platform cooling arrangement 130, the first plate 132 may be referred to as an "impingement plate" or "outboard plate", and the second plate 138 maybe referred to as a "closeout plate" or "inboard plate". Further, the first plenum 133 and the second plenum 139 may be referred to as a post-impingement plenum and a pre-impingement coolant plenum, respectively.

In an embodiment of the present application, the impingement plate 132 may include a raised portion 144, which may function as a spacer or standoff, thereby establishing the radial height of the first plenum 133. The raised portion 144 of the impingement plate 132 may be of a substantially constant height such that a predetermined clearance exists between the impingement plate 132 and the platform underside 114. The predetermined clearance may provide a desired configuration of the first plenum 133, and may be based on a clearance at which impingement cooling of the platform underside 114 has a desired impingement cooling or heat transfer characteristic. In another embodiment of the present application, the raised portion 144 of the impingement plate 132 may form an outer edge lip that extends around the circumference of the impingement plate 132. The outer edge lip of the impingement plate 132 may be configured such that, upon assembly, it forms a seal against the platform underside 114. This may seal the first plenum 133 around its periphery and substantially prevent leakage of coolant from the first plenum 133.

In an embodiment of the present application, the closeout plate 138 may also include a raised portion 146. The raised portion 146 of the closeout plate 138 may be of a substantially constant height such that, upon assembly, a predetermined or desired clearance exists between the impingement plate 132 and the closeout plate 138. The predetermined clearance may provide a desired configuration of the second plenum 139. In another embodiment of the present application, the raised portion 146 of the closeout plate 138 may include an outer edge lip that extends around the circumference of the closeout plate 138. The outer edge lip or ridge of the closeout plate 138 may be configured such that, upon assembly, it forms a seal against the impingement plate 132. This may seal the second plenum 139 around the periphery of the second plenum 139 and substantially prevent leakage of coolant from the second plenum 139. Further, sealing of the first plenum 133 and the second plenum 139 may substantially result in a closed circuit between the inlet channel 141 and the outlet channel 142. Thus, coolant flowing through the first plenum 133 and the second plenum 139 may return to the interior cooling passage 116 for further use. Those of ordinary skill in the art will appreciate that any other sealing means may be present between the impingement plate 132 and the platform underside 114, and/or the impingement plate 132 and the closeout plate 138, for example, but not limited to, mechanical gasket, chemical sealant and the like.

In an embodiment of the present application, the impingement plate 132 and the closeout plate 138 may be non-integrally formed components. In another embodiment of the present application, the impingement plate 132, the closeout plate 138, and the platform 110 all may be non-integrally formed components. In another embodiment of the present application, the impingement plate 132 and the closeout plate 138 may be integrally formed components, and the integrally formed first plate and second plate may be non-integrally formed components with respect to the platform 110. In various embodiments of the present application, the impingement plate 132 and/or the closeout plate 138 may be securely attached to the platform 110 by one or more methods, for example, but not limited to, interference fit, welding, brazing, adhesives, and the like. However, because of the plates 132, 138 are not integral to the platform 110 of the rotor blade 100, each remains detachable (i.e., able to be conveniently removed for reuse, repair, tuning, inspection, and/or be reattached for continued use or replaced with another similar or modified component) given any of these types of conventional connections.

Though not shown, in some embodiments, film cooling apertures may be provided through the outer walls defining the first 133 and second plenums 139. These may be used to aim coolant into the cavity defined by the slashfaces of adjacent rotor blades 100.

Those of ordinary skill in the art will appreciate that the platform cooling arrangement 130 may be retrofitted in existing turbine rotor blades as at least one of the first and second plates 132 and 138, and the platform 110 may be non-integrally formed components. Further, the platform cooling arrangement 130 may utilize existing interior cooling passages 116 of turbine rotor blades, providing the flexibility to employ embodiments of the present invention in existing blades or new ones. The impingement plate 132 and the closeout plate 138 may also be adjustable through post cast changes. Various impingement parameters, for example, but not limited to, number, dimensions and arrangement of the impingement apertures 140, exact profiles of the first and second plates 132 and 138, may be altered to optimize impingement cooling of the platform 110. Thus, the platform cooling arrangement 130 may be tailor-made to suit various turbine rotor blade configurations and/or changing conditions.

The platform cooling arrangement 130 may also involve a cost effective and efficient manufacturing process as the first plate 132 and second plates 138 may manufactured separately from the various components of turbine rotor blades. Moreover, the first and second plates 132 and 138 may be prefabricated and then assembled on site.

FIG. 7 illustrates perspective views of the impingement plate 132 and the closeout plate 138 according to an exemplary embodiment of the present application. In an embodiment of the present application, the impingement plate 132 may include a curved edge 154 and a straight edge 155. In another embodiment of the present application, the curved edge 154 may approximately coincide in shape to the curved profile of the airfoil 102. In a further embodiment of the present application, the closeout plate 138 may have a substantially same profile as the impingement plate 132, and may include a curved edge 158 and a straight edge 159. This may enable the closeout plate 138 to be substantially aligned below the impingement plate 132 to form the second plenum 139. Further, the flat pocket 131 may also have a profile shape that substantially coincides with the profile of the impingement plate 132.

As further illustrated in FIG. 7, the impingement apertures 140 of the impingement plate 132 may be substantially arranged in multiple rows. The rows of the impingement apertures 140 may be substantially perpendicular or oblique to the straight edge 155 of the impingement plate 132. However, the impingement apertures 140 may be arranged in any other configuration (for example, staggered) without deviating from the scope of the present application. In an embodiment of the present application, the impingement plate 132 may include a central raised portion 164. The central raised portion 164 of the impingement plate 132 may improve impingement cooling of the platform 110 by substantially dividing the first plenum 133 into two regions. In another embodiment of the present application, the closeout plate 138 may also include a central raised portion 166. The central raised portion 166 may control the flow of the coolant from the second plenum 139 through the impingement apertures 140.

FIG. 9 illustrates a flow diagram 200 depicting an exemplary method of creating the platform cooling arrangement 130, according to an embodiment of the present application. The flow diagram 200 may begin at a step 202 where the outlet channel or low-pressure connector 142 may be machined. The outlet channel 142 may have a predetermined configuration and location such that the outlet channel 142 connects the low-pressure coolant region of the interior cooling passage 116 to the first plenum 133 once the first plenum 133 is formed. Subsequently, at a step 204, the inlet channel or high-pressure connector 141 may be machined. The inlet channel 141 may have a predetermined configuration and location such that the inlet channel 141 connects the high-pressure coolant region of the interior cooling passage 116 to the second plenum 139 once the second plenum 139 is formed.

At a step 206, the flat pocket 131 may be machined in the platform underside 114 in a location that substantially coincides with the pressure side of the airfoil 102. Further, the flat pocket 131 may have a profile shape that substantially coincides with the profile of the pressure side of the airfoil as well as the profile of the impingement plate 132 and the closeout plate 138.

At a step 207, the impingement plate 132 and the closeout plate 138 may be fabricated according to desired specifications.

At a step 208, the impingement plate 132 may be attached to the platform underside 114 so that the impingement plate 132 resides inboard and in spaced relation to the platform underside 114, thereby forming the first plenum 133 between the impingement plate 132 and the platform underside 114. Further, the impingement plate 132 may be attached to the platform underside 114 such that the impingement plate 132 resides in the flat pocket 131. Subsequently, at a step 210, the closeout plate 138 may be attached to the impingement plate 132 so that the closeout plate 138 resides inboard and in spaced relation to the impingement plate 132, thereby forming the second plenum 139 between the impingement plate 132 and the closeout plate 138. Further, the closeout plate 138 may be attached to the impingement plate 132 such that the profiles of the impingement plate 132 and the closeout plate 138 substantially align.

At a step 212, the first plenum 133 may be sealed along an interface of the outer edge lip 314 of the impingement plate 132 and the platform underside 114. Thereafter, at a step 214, the second plenum 139 may be sealed along an interface of the outer edge lip of the closeout plate 138 and the impingement plate 132. Sealing of the first plenum 133 and the second plenum 139 may substantially result in a closed circuit between the inlet channel and the outlet channel.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises a high-pressure coolant region and a low-pressure coolant region, and wherein the platform includes a platform underside along an inboard surface; the platform cooling arrangement comprising:
   a first plate that resides inboard and in spaced relation to the platform underside, the first plate being configured such that a first plenum is formed between the first plate and the platform underside;
   a second plate that resides inboard and in spaced relation to the first plate, the second plate being configured such that a second plenum is formed between the second plate and the first plate;
   wherein:
      the second plenum comprises at least one inlet channel that connects to the high-pressure coolant region of the interior cooling passage;
      the first plenum comprises at least one outlet channel that connects to the low-pressure coolant region of the interior cooling passage; and
      the first plate comprising a plurality of impingement apertures.

2. The platform cooling arrangement according to claim 1, wherein the first plate, the second plate, and the platform comprise non-integrally formed components.

3. The platform cooling arrangement according to claim 1, wherein the first plate and the second plate are detachably connected to the platform.

4. The platform cooling arrangement according to claim 1, wherein:
   the platform comprises a planar shape;
   the interior cooling passage comprises a serpentine interior cooling passage;
   in use, the interior cooling passage is configured to have a coolant flow direction; and
   relative to the coolant flow direction, the high-pressure coolant region comprises an upstream portion of the interior cooling passage and the low-pressure coolant region comprises a downstream portion of the interior cooling passage.

5. The platform cooling arrangement according to claim 1, wherein:
   the platform underside comprises an axially and circumferentially extending planar surface;
   the first plate comprises a planar plate that, on one side, includes a raised portion that is configured to maintain a predetermined clearance between the first plate and the platform underside, wherein the predetermined clearance corresponds to a desired impingement cooling characteristic;
   the second plate comprises a planar plate that, on one side, includes a raised portion that is configured to maintain a predetermined clearance between the second plate and the first underside, wherein the predetermined clearance corresponds to a desired second plenum height dimension.

6. The platform cooling arrangement according to claim 5, wherein the predetermined clearance between the first plate and the platform underside is based on a clearance at which the resulting impingement cooling of the platform underside comprises a desired heat transfer characteristic.

7. The platform cooling arrangement according to claim 5, wherein:
   the raised portion of the first plate comprises an outer edge lip;
   the outer edge lip of the first plate extends around the circumference of the first plate;
   the outer edge lip of the first plate is configured to form a seal against the platform underside and thereby seal the first plenum along its periphery;
   the raised portion of the second plate comprises an outer edge lip;
   the outer edge lip of the second plate extends around the circumference of the second plate; and
   the outer edge lip of the second plate is configured to form a seal against the first plate and thereby seal the second plenum along its periphery.

8. The platform cooling arrangement according to claim 1, wherein the impingement apertures comprise narrow apertures that extend through the thickness of first plate such that, when a supply of pressurized coolant is introduced into the second plenum, the impingement apertures impinge the pressurized coolant.

9. The platform cooling arrangement according to claim 8, wherein the impingement apertures comprise a cylindrical shape and are oriented such that each is approximately perpendicular to the surface of the platform underside.

10. The platform cooling arrangement according to claim 8, wherein the impingement apertures are configured such that a flow of coolant therethrough is focused against the platform underside.

11. The platform cooling arrangement according to claim 1, wherein:
   the first plate comprises an impingement plate;
   the second plate comprises a closeout plate;
   the first plenum comprises a post-impingement coolant plenum;
   the second plenum comprises a pre-impingement coolant plenum;
   the outlet channel of the first plenum connects to the low-pressure coolant region of the interior cooling passage via a machined low-pressure connector, through which, in operation, post-impingement coolant rejoins the flow of coolant through the interior cooling passage; and
   the inlet channel of the second plenum connects to the high-pressure coolant region of the interior cooling passage via a machined high-pressure connector, through which, in operation, pre-impingement coolant is bled from the interior cooling passage and supplied to the second plenum.

12. The platform cooling arrangement according to claim 1, wherein the first plenum and the second plenum are sealed such that substantially all of the coolant flowing therethrough is returned to the interior cooling passage.

13. The platform cooling arrangement according to claim 1, wherein the first plate and the second plate are located on a region of platform underside that coincides with the pressure side of the airfoil.

14. The platform cooling arrangement according to claim 13, wherein, in profile, the first plate comprises a curved edge and a straight edge, the curved edge corresponding in shape to the curved profile of the airfoil where the airfoil connects to the platform; and wherein the second plate comprises substantially the same profile as the first plate.

15. A platform cooling arrangement in a turbine rotor blade having a platform at an interface between an airfoil and a root, wherein the airfoil and the root include a interior cooling passage formed therein, the interior cooling passage being configured to connect to a coolant source through the root, wherein, in operation, the interior cooling passage comprises at least a high-pressure coolant region and a low-pressure coolant region, and wherein the platform includes a platform underside along an inboard surface; the platform cooling arrangement comprising:

an inboard plenum and an outboard plenum formed by non-integral, radially stacked plates that are affixed to the platform underside;

wherein:

the inboard plenum comprises at least one inlet channel that connects to the high-pressure coolant region of the interior cooling passage;

the outboard plenum comprises at least one outlet channel that connects to the low-pressure coolant region of the interior cooling passage; and         the outboard plate comprises impingement apertures that are configured such that, in operation, the impingement apertures impinge a flow of coolant against the platform underside.

\* \* \* \* \*